United States Patent [19]

Damkjaer

[11] Patent Number: 5,305,869
[45] Date of Patent: Apr. 26, 1994

[54] CHAIN LINK CONVEYOR

[75] Inventor: Poul E. Damkjaer, Vejle, Denmark

[73] Assignee: Maskinfabrikken Baelitix A/A, Vejle, Denmark

[21] Appl. No.: 21,663

[22] Filed: Feb. 24, 1993

[30] Foreign Application Priority Data

Feb. 24, 1992 [DK] Denmark .................. 232/92

[51] Int. Cl.⁵ ............................... B65G 13/02
[52] U.S. Cl. ......................... 198/689.1; 198/853
[58] Field of Search ............. 198/853, 850, 851, 852, 198/689.1

[56] References Cited

U.S. PATENT DOCUMENTS

| | | | |
|---|---|---|---|
| 3,785,476 | 1/1974 | Poerink | 198/853 |
| 4,438,838 | 3/1984 | Hodlewsky et al. | 198/853 |
| 4,688,670 | 8/1987 | Lapeyre | 198/853 |
| 4,709,807 | 12/1987 | Poerink | 198/853 |
| 5,000,312 | 3/1991 | Damkjaer | 198/853 |
| 5,174,438 | 12/1992 | Witham et al. | 198/853 |

Primary Examiner—Cheryl L. Gastineau
Attorney, Agent, or Firm—Antonelli, Terry, Stout & Kraus

[57] ABSTRACT

A chain link conveyor formed of a number of identical plastic chain links with a number of eye-shaped hinge parts being provided in the edge of opposite sides of the individual chain links. The hinge parts are arranged so as to be coupled together with corresponding hinge parts in adjacent chain links by a common pin or pivot. On the underside, between the hinge parts, ribs extend in the conveying direction of the chain link conveyor. The ribs on the underside are configured with transverse openings or grooves so that a vacuum can distribute itself over the entire underside of the chain link when the chain link is used as a chain link vacuum conveyor.

20 Claims, 5 Drawing Sheets

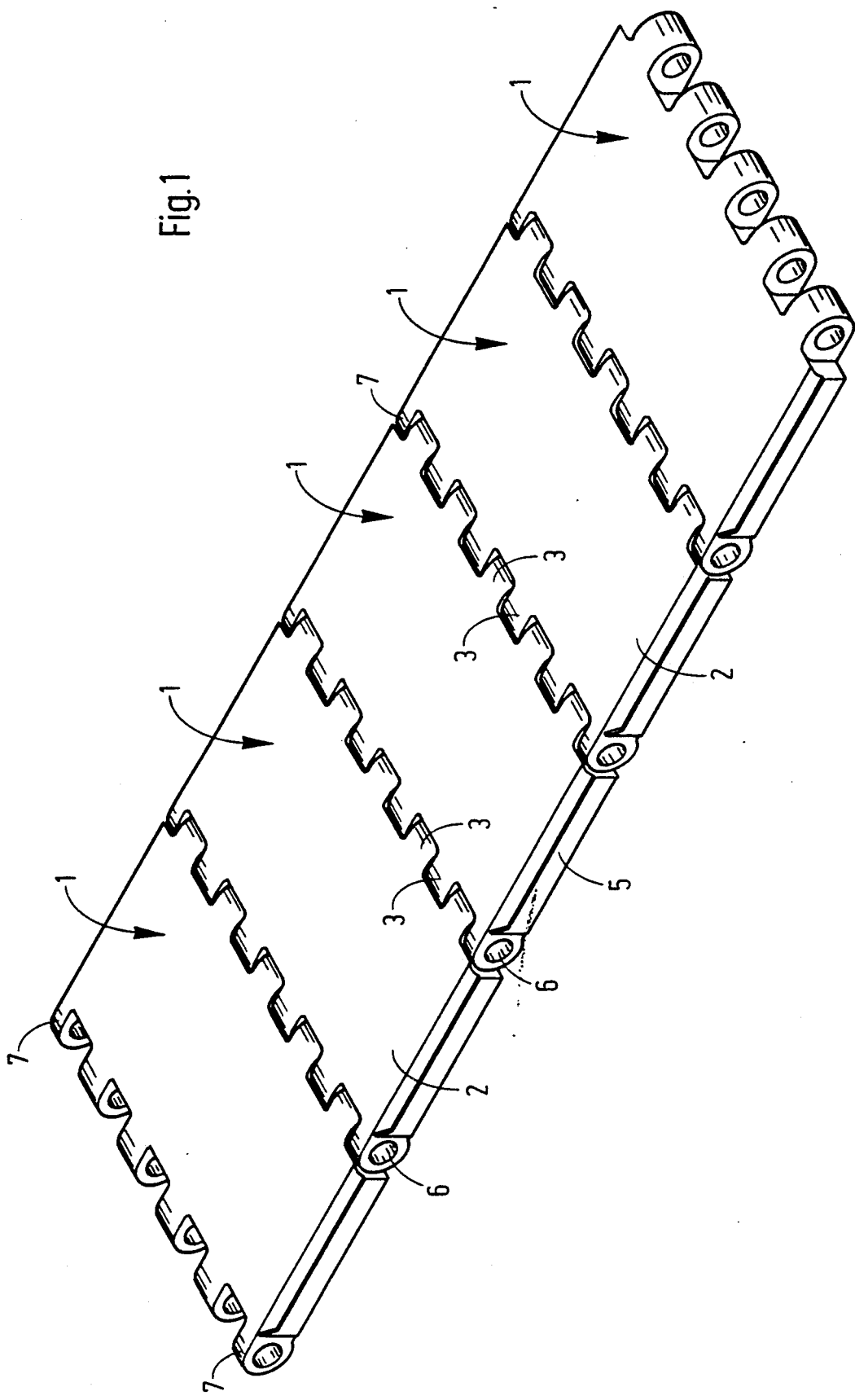

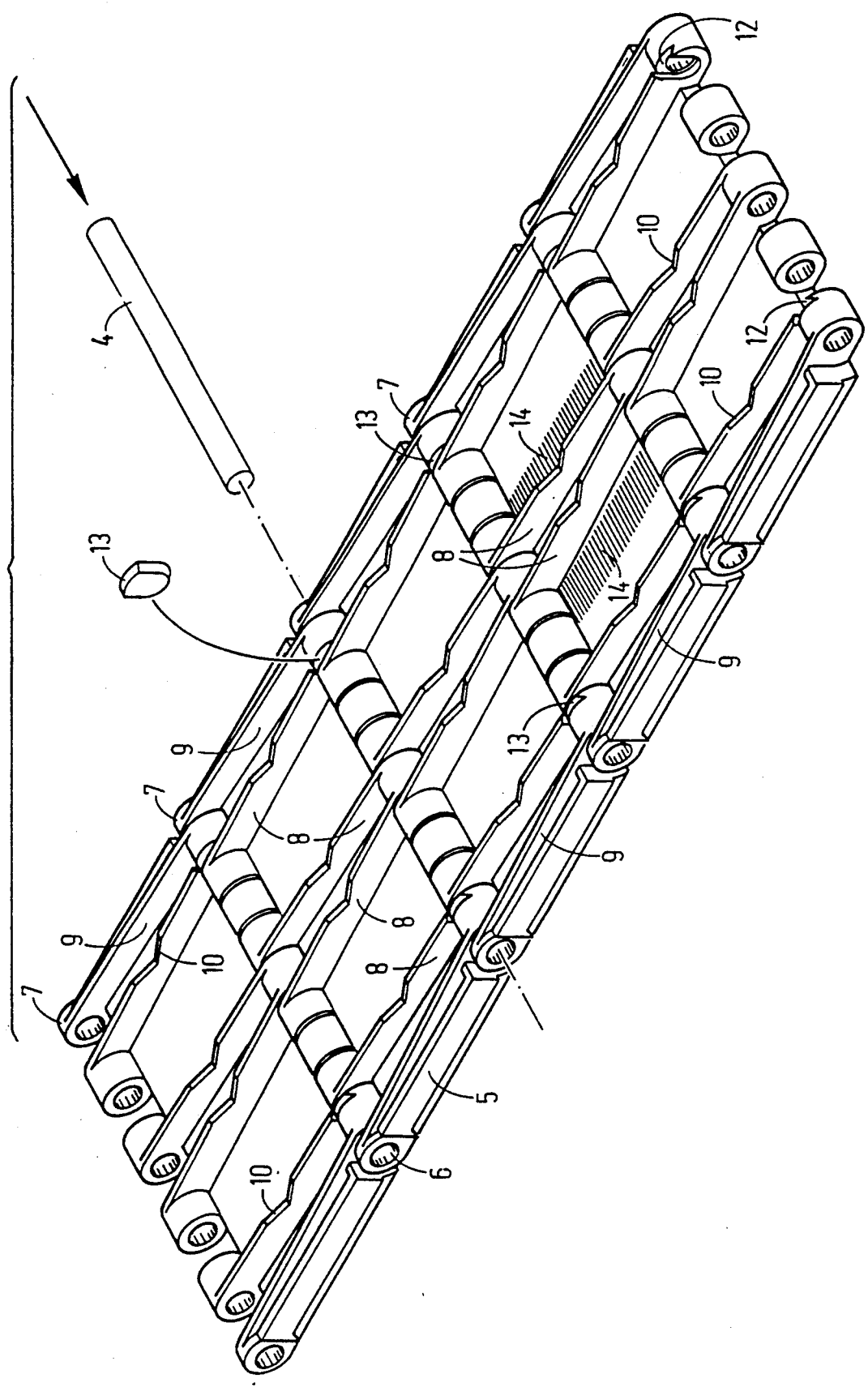

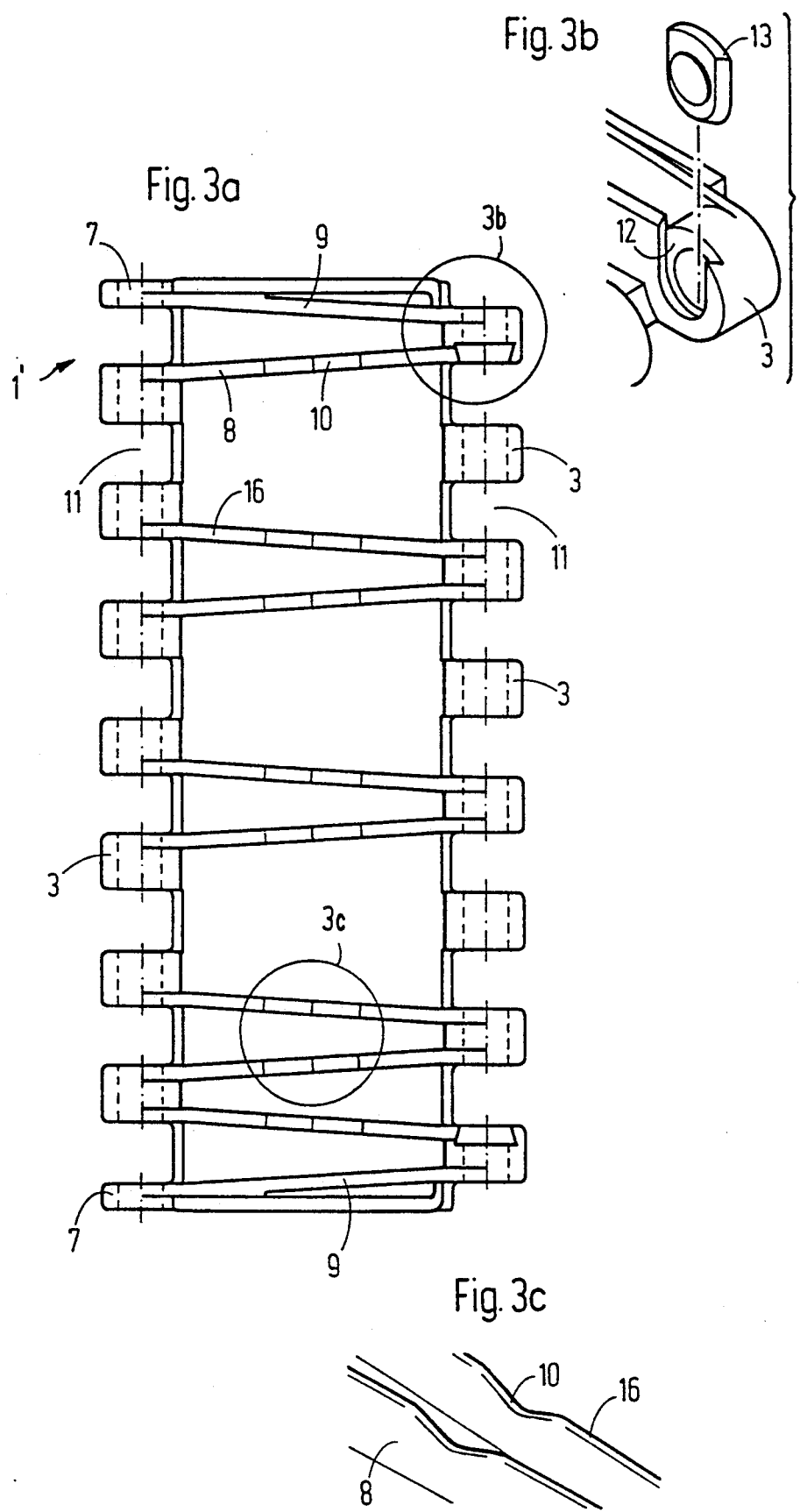

CHAIN LINK CONVEYOR

FIELD OF THE INVENTION

The present invention relates to a chain link conveyor or so-called chain belts comprising a plurality of plastic chain links, each having an upper surface for supporting items to be conveyed, with a plurality of eye-shaped hinge parts along opposite edges and lying under the upper surface, and with the hinge pins being adapted to be coupled with corresponding hinge parts by a common pin or pivot, which hinge parts on the opposite side being staggered with respect to each other, and hinge parts on the opposite side to be coupled or connected to each other by ribs extending substantially in the conveying direction of the chain link conveyor.

BACKGROUND OF THE INVENTION

Conveyors of the aforementioned type have been proposed in, for example, U.S. Pat. No. 3,785,476 and Danish Patent 159,544 corresponding to U.S. Pat. No. 5,000,312.

Each chain link in a conveyor of the aforementioned type generally has a length in a conveying direction of, for example, 3-10 cm, and a width from about 5-6 cm to about 16-20 cm, so that straight running conveyors can be constructed in almost any width by, for example, arranging several chain links at the side of one another and using common dowels or pivots. All of the chain links in a conveyor are normally identical, and are produced as a unit in suitable plastic material by, for example, injection molding of, for example, acetal, polypropylene, polyethylene or suitable similar material.

Chain links of the aforementioned type may be configured with various surfaces such as, for example, with openings as shown in U.S. Pat. No. 3,785,476 or with a plane, uninterrupted surface as shown in Danish Patent 159,544 and corresponding U.S. Pat. No. 5,000,312. There are a number of different reasons for providing holes in the surface such as, for example, in order to increase friction, to reduce the weight or amount of material used, for drainage, etc.

SUMMARY OF THE INVENTION

In accordance with the present invention, a chain link of the aforementioned type is provided with a transversely extending opening provided in at least one of the ribs which couple the hinge parts lying on the opposite edges of the length.

By virtue of the above noted features of the present invention, the resulting chain link has the advantage that the link can be used as a vacuum conveyor chain, if the chain links are configured with holes in the support surface.

The support surface of the chain link of the present invention may have any configuration from a plain and uninterrupted surface and with perforations covering up to 50% of the support surface. The new configuration of the underlying ribs ensures that a vacuum lying under the conveyor is distributed uniformly over the entire underside of the chain link, without any reduction in the strength of the chain, without any change in the frictional conditions against the underlying wear track, and also without the chain link suffering any type of disadvantages in general. It is hereby possible to construct a broad conveyor track with evenly-distributed vacuum over the entire breadth or width of a conveyor, which is advantageous in, for example, the conveying of large numbers of empty cans for canned goods or the like in a manufacturing plant. The vacuum increase the friction between the conveyor and the items, for example, empty cans, so that items on the conveyor can be conveyed forward at a high speed.

The chain link conveyor according to the present invention thus provides additional and better possibilities of utilization than the conventional conveyor chains.

In accordance with further features of the present invention, the transverse opening provided in at least one rib may be configured in such a manner that the vacuum distribution becomes uniform over the entire breadth or width of the conveyor.

The opening may, in accordance with the present invention, be provided or configured with rounded edges and a transition to a downwardly-facing edge of the rib so that there will be no friction-increasing edges or areas in the rib from which the formation of cracks can arise.

By constructing the chain link conveyor so that each rib, with the exception of the outermost ribs of the respective chain links, is provided with an opening, it is ensured that there is a full vacuum under the chain up to the edge of the chain and, at the same time, there is no reduction in the strength of the outermost-lying ribs which can be the hardest loaded if the chain link conveyor is not driven with completely uniform traction over the entire breadth or width of the link.

According to still further features of the present invention, each chain link has a large number of hinge parts in relation to the breadth of the link, with ribs extending in pairs from a hinge part at one edge of the link to adjoining hinge parts at the opposite edge. By virtue of these features, the resulting chain is strong with low friction against the underlying wear track and, since the distance between the ribs is small, rib pairs can be used as side guides for a chain if the drive wheel used is a broad sprocket provided with an annular track for the rib pairs. This is particularly relevant with conveyors made up of a single chain track of relatively narrow chain links having a breadth or width of, for example, 4-8 cm.

According to the present invention, each hinge part of the chain link has a breadth or width of between 4-8 mm and, preferably, approximately 6 mm, whereby the resulting chain is particularly robust and reliable in operation by virtue of the fact that many hinges are provided in relation to the breadth or width of the conveyor. Moreover, this results in a smoother and more gliding operation and thus the conveyor has a very long service life, with the reason being that the power transmission is distributed evenly over the entire breadth or width of the chain link whereby the unavoidable wear is distributed evenly over all chain links.

According to the invention, a locking valve for each pivot is placed in a recess for accommodating the dowel on an inwardly-facing side of the outermost hinge parts, at that side where there are only hinge parts with a full breadth or width. By virtue of these features, it is ensured, in the event of strong lateral forces, that pivots cannot damage the hinge link in which a locking dowel is inserted, nor press the locking dowel out of its groove. Chain link conveyors of the type considered in connection with this application are sometimes used for broad conveyors and in very great lengths which involve great distance between the driving end and the carrier end. If the traction is not completely uniform over the chain breadth or width, the pivot can be subjected to a lateral force which can ruin the chain if the locking dowel is placed in the outermost, half hinge parts.

If the chain links are configured in the manner described for accommodating the locking dowel in accordance with the present invention, the possibility is at the same time provided of placing the notch for the locking dowel in one of the hinge parts from which the two ribs extend, that is, in the hinge parts which the very strongest.

The chain link of the present invention may have an upper surface provided with through openings, holes, slots, etc. between the ribs and suitably distributed over the upper surface, whereby it is possible to construct vacuum conveyor chains without reducing the strength, in that all openings in the surface for vacuum are disposed between the ribs, so that the tensile strength of the chain link is not reduced.

BRIEF DESCRIPTION OF THE DRAWINGS

The invention will now be described in more detail with reference to the accompanying drawings, wherein:

FIG. 1 is a perspective view of a section of a chain link conveyor according to the present invention;

FIG. 2 is an exploded perspective view of the section of chain link of FIG. 1, as viewed from an underside thereof;

FIG. 3a is a bottom plan view of a slightly broader chain link for a chain link conveyor constructed in accordance with the present invention;

FIG. 3b is an exploded detail view of an area 3b in FIG. 3a;

FIG. 3c is an enlarged detail view of the area 3c in FIG. 3a; and

DETAILED DESCRIPTION

Figure 6:
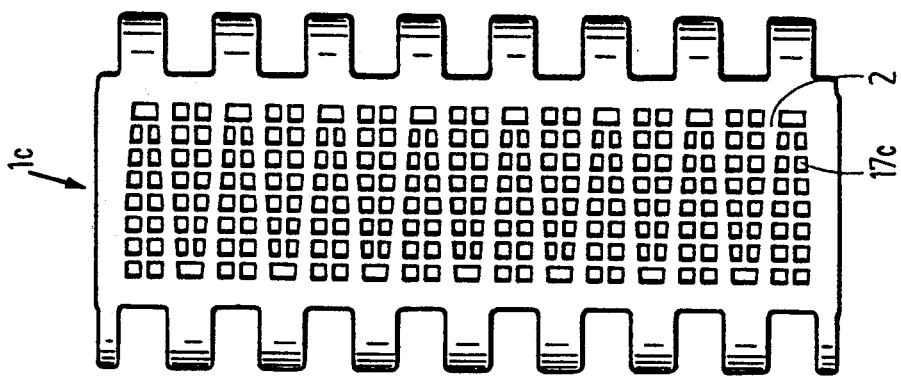
FIGS. 4–8 are top plan views of alternate embodiments of chain links according to the present invention, with different preparations or openings in the upper surface.

Referring now to the drawings wherein like reference numerals are used throughout the various views to designate like parts and, more particularly, to FIGS. 1 and 2, according to these figures, a chain link conveyor comprises a plurality of identical chain links generally designated by the reference numeral 1 which may be configured as shown or as shown in FIGS. 3a–3b, or with any other breadth or width.

Each chain link 1 comprises a support surface for the items which are to be conveyed, with each side or edge of the surface, as viewed in a conveying direction, extending to eye-shaped hinge parts 3 which are staggered with respect to the eye-shaped hinge parts 3 on the opposite side resulting in one of the sides including an outermost hinge part 7 having a breadth or width is half a breadth or width of the hinge part 3. The chain links 1 are assembled in a known manner with a pivot or pin 4 being inserted between the link 1, with the pivot or pin 4 being placed transversely in holes 6 in the hinge parts 3. Moreover, the hinge parts 3 are configured so that they are below the support surface 2, and in such a manner that the upper side of the assembled hinge parts 3 also constitute a part of a support surface, so that the overall surface of the conveyor is even.

As shown most clearly in FIGS. 2 and 3, ribs 8, 9 are disposed on an underside of each of the links 1, 1', with the ribs 8, 9 extending between and being integral with the hinge parts 3 and 7. As shown, the ribs 8, 9 are arranged in pairs so that both ribs 8, 9 in a pair extend from one hinge part as shown, and extend to two adjacent hinge parts also as shown. The ribs 8, 9 hereby extend substantially in the lengthwise direction of the conveyor, which is the direction in which the conveyor runs, and thus the ribs do not contribute to any great degree to the friction against the underlying wear track for reasons of their direction. Furthermore, the chain links 1, 1' are limited sideways by sides 5, which externally are provided with a smooth surface to reduce the friction against possible track sides, and so that openings or gaps do not arise between the conveyor and the track side or a neighboring track.

The chain link generally designated by the reference numeral 1' of FIGS. 3a–3c is slightly broader than the chain links of FIGS. 1 and 2. The chain links 1 or 1' are produced in a series of different breadths in intervals corresponding to the overall breadth of a hinge part 3 and a clearance 11 between adjacent hinge parts 3, that is, the chain links are produced in intervals of 11–14 mm with regard to the breadth of the chain links 1 or 1'.

FIGS. 3a–3c clearly illustrate the manner by which an opening 10 can be formed in each rib, for example, extending from the edge 16 of the rib, that is, the edge which faces away from the support surface 2 and towards the underlying wear track (not shown). The opening 10 is configured with gentle and even rounding or rounded portions so that any possible reduction from the strength is minimized, and no places or areas are created from which cracks or breaks can arise. The opening 10 is formed in all ribs 8, with the exception of the outermost ribs 9, so that the possible vacuum under the conveyor chain can be maintained between the outer ribs 9. The configuration of the opening 10 as shown in FIGS. 3a–3c is only one example of how this opening can be formed. Those familiar with the art will be able to show other forms of notches, grooves, holes or recesses which provide necessary and sufficient clearance, so that a vacuum can be distributed as desired under the full breadth or width of the chain link. To enable assembly of identical chain links to form a conveyor chain as shown in FIG. 1, as mentioned earlier, hinge parts 7 with half breadth or width are provided at each side of the respective chain links. To retain the pivots 4 in their holes, a locking dowel 13 (FIG. 3d) is inserted at each end of the pivot. The locking dowel 13 and the undercut notch 12 for accommodating the dowel are configured substantially as disclosed in Danish Patent 159,544 and corresponding U.S. Pat. No. 5,000,312. If each of the locking dowels 13 were inserted in the outermost hinge parts 7, the hinge parts 7 would be weakened because of their slight breadth. Consequently, as shown in FIG. 3b the locking dowel have therefore being disposed as shown, namely in the notch 12 disposed on the inwardly-facing side of the respective outermost hinge parts 7, or at that side where the dowel parts 13 face only hinge parts of a full breadth.

In FIG. 2, the lines 14 represent the position of a chain wheel, for example, a driving sprocket, which has an annular groove for a rib pair 8, so that a rib pair is used as side guides for the chain in connection with the chain wheel. This is possible because the ribs 8 are only a short distance from each other.

Figure 5:
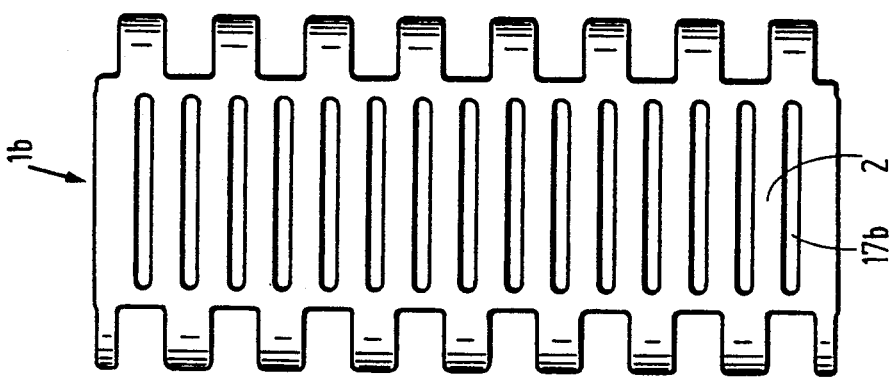
Figure 4:
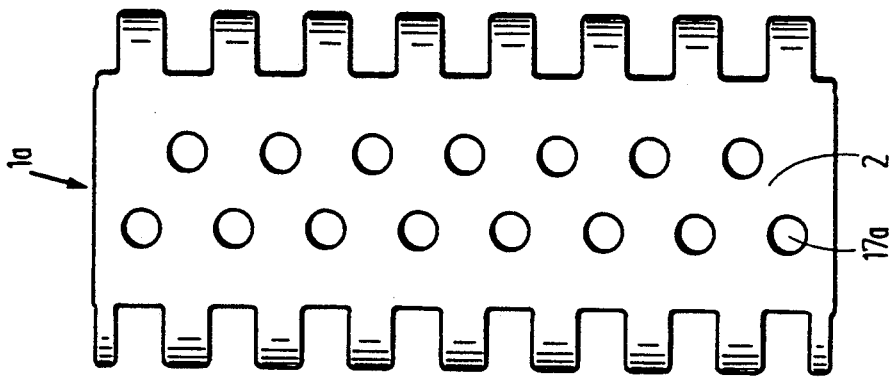
Figure 8:
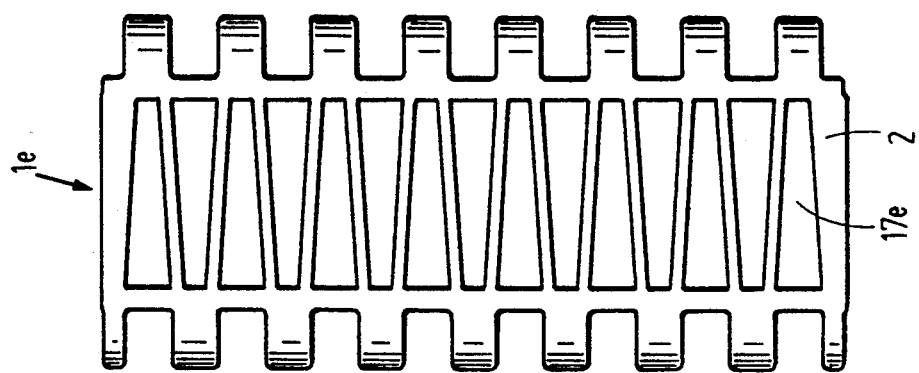
Figure 7:
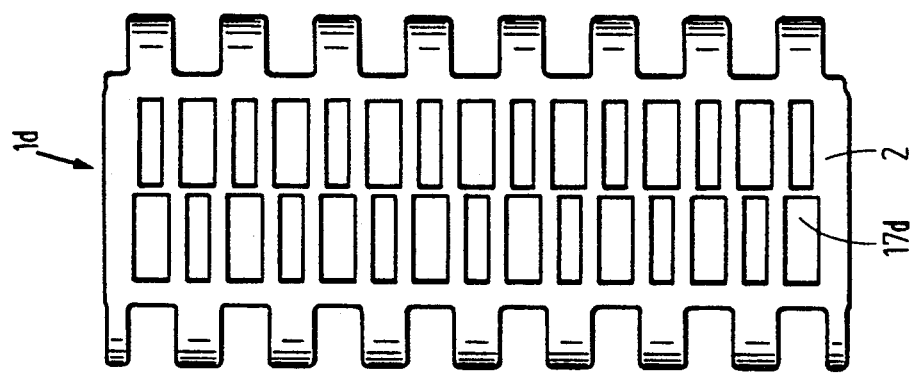

FIGS. 4–8 provide examples of various chain links 1a–1e according to the invention with different types and sizes of openings or holes 17a-17e for drainage, vacuum etc. provided in the surface 2. All of the openings 17a-17e are arranged between the ribs 8, 9 so that the ribs 8, 9 are not weakened, and in such a manner that the chain links are of a full strength regardless of the number and sizes of the holes. The chain link 1a in FIG. 4 has a perforation corresponding to 7.5% of the surface, the chain link 1b in FIG. 5 has a perforation corresponds to 18% of the surface, the chain link 1c in FIG. 6 has a perforation corresponding to 22% of the surface, the chain link 1d in FIG. 7 has a perforation corresponding to 36% of the surface, and the chain link 1e in FIG. 8 has a perforation corresponding to 46% of the surface.

The chain link conveyor according to the invention has no preferred direction of running, in that it is configured in such a manner that it can be run in both directions without any problems.

As mentioned above, the individual chain link according to the invention is produced in different breadths or widths, and extends in the conveying direction for 3-6 cm, and, preferably, approximately 4.5 cm, with the overall thickness of the chain link being on the order of 5-9 mm. The hinge joint of the chain link has a breadth of 4-8 mm and, preferably, approximately 6 mm, with the clearances between the hinge joints being of the same order. The chain links can be coupled together by pivots or pins of plastic or steel, with the pivots or pins having a diameter of 4-6 mm, and, preferably, approximately 5 mm.

I claim:

1. A chain link conveyor comprising:
   a plurality of identical plastic chain links, each of said chain links including an upper surface adapted to support items to be conveyed;
   a plurality of eye-shaped hinge parts provided at opposite ends of each of the chain links and lying beneath the upper surface, said hinge parts being adapted to be coupled together with corresponding hinge parts in adjacent chain links by a pivot, said hinge parts on the opposite sides of each chain link being staggered with respect to each other;
   ribs provided on an underside of each chain link for connecting the hinge parts lying opposite each other, said ribs extending substantially in a conveying direction of the chain link conveyor; and
   at least one transversely extending opening provided in at least one of said ribs for enabling an application of a uniform vacuum over an entire width of each of the chain links of the conveyor.

2. A chain link conveyor according to claim 1, wherein, with the exception of outermost ribs provided at respective lateral edges of each chain link, each remaining rib is provided with at least one transverse opening.

3. A chain link conveyor according to claim 1, wherein the plurality of hinge parts are arranged across a breadth of the chain link, and wherein the ribs extend in pairs from a hinge part at one end of the chain link to adjoining hinge parts provided at the opposite end.

4. A chain link conveyor according to claim 3, wherein each hinge part has a breadth of 4-8 mm.

5. A chain link conveyor according to claim 1, wherein a locking dowel is provided for locking respective ends of each pivot, and wherein a recess is provided on an inwardly-facing side of each outermost hinge part for accommodating the respective locking dowels.

6. A chain link conveyor according to claim 1, wherein the upper surface is provided with openings between the ribs, said openings being suitably distributed over the upper surface.

7. A chain link conveyor according to 1, wherein each hinge part has a breadth of 4-8 mm.

8. A chain link conveyor comprising:
   a plurality of identical plastic chain links, each of said chain links including an upper surface adapted to support items to be conveyed;
   a plurality of eye-shaped hinge parts provided at opposite ends of each of the chain links and lying beneath the upper surface, said hinge parts being adapted to be coupled together with corresponding hinge parts in adjacent chain links by a pivot, said hinge parts on the opposite sides of each chain link being staggered with respect to each other;
   ribs provided on an underside of each chain link for connecting the hinge parts lying opposite each other, said ribs extending substantially in a conveying direction of the chain link conveyor, and
   wherein the at least one transverse opening is fashioned as one of a groove or recess in an edge of the at least one rib, which edge faces away from the upper surface.

9. A chain link conveyor according to claim 8, wherein the at least one transverse opening includes rounded edges and transition portions to the edge of the ribs.

10. A chain link conveyor according to any one of claims 8 or 9, wherein with the exception of the outermost ribs provided at the respective lateral edges of each chain link, each remaining rib is provided with at least one transverse opening.

11. A chain link conveyor according to any one of claims 8 or 9, wherein the plurality of hinge parts are arranged across a breadth of the chain link, and wherein the ribs extend in pairs from a hinge part at one end of the chain link to adjoining hinge parts provided at the opposite end.

12. A chain link conveyor according to claim 11, wherein each hinge part has a breadth of 4-8 mm.

13. A chain link conveyor according to any one of claims 8 or 9, wherein a locking dowel is provided for locking respective ends of each pivot, and wherein the recess is provided on an inwardly-facing side of each outermost hinge part for accommodating the respective locking dowels.

14. A chain link conveyor according to any one of claims 8 or 9, wherein the upper surface is provided with openings between the ribs, said openings being suitably distributed over the upper surface.

15. A chain link conveyor according to any one of claims 8 or 9, wherein each hinge part has a breadth of 4-8 mm.

16. A chain link conveyor according to claim 15, wherein the breadth of the hinge part is approximately 6 mm.

17. A chain link conveyor comprising:
   a plurality of identical plastic chain links, each of said chain links including an upper surface adapted to support items to be conveyed;
   a plurality of eye-shaped hinge parts provided at opposite ends of each of the chain links and lying beneath the upper surface, said hinge parts being adapted to be coupled together with corresponding hinge parts in adjacent chain links by a pivot, said hinge parts on the opposite ends of each chain link being staggered with respect to each other;

ribs provided on an underside of each chain link for connecting the hinge parts lying opposite each other, said ribs extending substantially in a conveying direction of the chain link conveyor, and at least one transversely extending opening provided in at least one of said ribs, wherein, with the exception of the outermost ribs provided at the respective lateral edges of each chain link, each remaining rib is provided with at least one transverse opening, wherein the plurality of hinge parts are arranged across a breadth of the chain link, and wherein the ribs extend in pairs from a hinge part at one end of the chain link to adjoining hinge parts provided at the opposite end.

18. A chain link conveyor according to claim 17, wherein each hinge part has a breadth of 4-8 mm.

19. A chain link conveyor according to claim 18, wherein a locking dowel is provided for locking respective ends of each pivot in the chain link, and wherein a recess is provided on an inwardly-facing side of each outermost hinge part for accommodating the respective locking dowel.

20. A chain link conveyor according to claim 19, wherein the upper surface is provided with openings between the ribs and suitably distributed over the upper surface.

* * * * *